(12) United States Patent
Balsells et al.

(10) Patent No.: US 9,273,742 B2
(45) Date of Patent: Mar. 1, 2016

(54) COIL SPRINGS WITH COMPLEX COIL CONFIGURATIONS, ASSEMBLIES WITH COIL SPRINGS, AND RELATED METHODS

(71) Applicant: BAL SEAL ENGINEERING, INC., Foothill Ranch, CA (US)

(72) Inventors: Peter J. Balsells, Foothill Ranch, CA (US); Richard Dawson, Foothill Ranch, CA (US)

(73) Assignee: Bal Seal Engineering, Inc., Foothill Ranch, CA (US)

(*) Notice: Subject to any disclaimer, the term of this patent is extended or adjusted under 35 U.S.C. 154(b) by 0 days.

(21) Appl. No.: 14/165,294

(22) Filed: Jan. 27, 2014

(65) Prior Publication Data

US 2014/0219713 A1 Aug. 7, 2014

Related U.S. Application Data

(60) Provisional application No. 61/756,923, filed on Jan. 25, 2013.

(51) Int. Cl.
*B21F 3/12* (2006.01)
*B21F 35/00* (2006.01)
*F16B 21/18* (2006.01)
(Continued)

(52) U.S. Cl.
CPC ... *F16F 1/04* (2013.01); *B21F 3/12* (2013.01); *B21F 35/00* (2013.01); *F16B 21/186* (2013.01); *F16F 1/042* (2013.01); *F16F 1/045* (2013.01); *F16L 37/148* (2013.01); *F16F 2230/0005* (2013.01); *Y10T 403/602* (2015.01); *Y10T 403/7061* (2015.01); *Y10T 403/7073* (2015.01)

(58) Field of Classification Search
CPC ............ B21F 3/12; F16B 21/186; F16F 1/04; F16F 1/042; F16F 1/043; F16F 1/045; F16F 1/046; F16L 37/084; F16L 37/088; F16L 37/148; H01R 4/4863; H01R 13/187; H01R 13/2421; H01R 13/6277
USPC ......... 403/243, 270, 315–319, 326–328, 335, 403/375, DIG. 7, DIG. 14, 372
See application file for complete search history.

(56) References Cited

U.S. PATENT DOCUMENTS 4,655,462 A * 4/1987 Balsells ........................ 267/167
7,055,812 B2 * 6/2006 Balsells ........................ 267/167
(Continued)

FOREIGN PATENT DOCUMENTS

CN 101832351 A 9/2010
EP 0890758 A2 1/1999
EP 1921355 A1 5/2008

OTHER PUBLICATIONS

Translation of CN 101832351 A. Multi-connection helical spring. Dexu, et al. Sep. 15, 2010.*
(Continued)

*Primary Examiner* — Josh Skroupa
(74) *Attorney, Agent, or Firm* — Klein, O'Neill & Singh, LLP

(57) ABSTRACT

Coil springs with a plurality of interconnected coils each being defined by a wire path that results in a coil cross section that, when viewed along the coil axis, has at least two differentiated spaces each confined by the wire. Assemblies using such coil springs are also disclosed.

22 Claims, 12 Drawing Sheets

(51) Int. Cl.
*F16F 1/04* (2006.01)
*F16L 37/14* (2006.01)

(56) References Cited

U.S. PATENT DOCUMENTS

2010/0029145 A1 2/2010 Balsells et al.
2011/0062640 A1 3/2011 Leon

OTHER PUBLICATIONS

International Search Report on related PCT Application No. PCT/2014/013210 from International Searching Authority (KIPO) dated May 8, 2014.
Written Opinion on related PCT Application No. PCT/2014/013210 from International Searching Authority (KIPO) dated May 8, 2014.

* cited by examiner

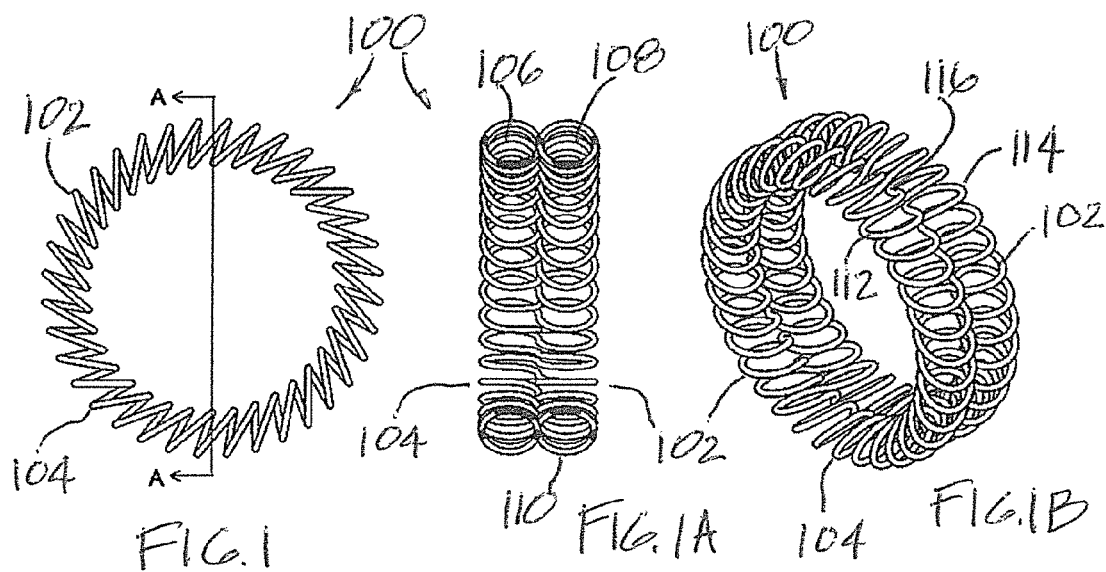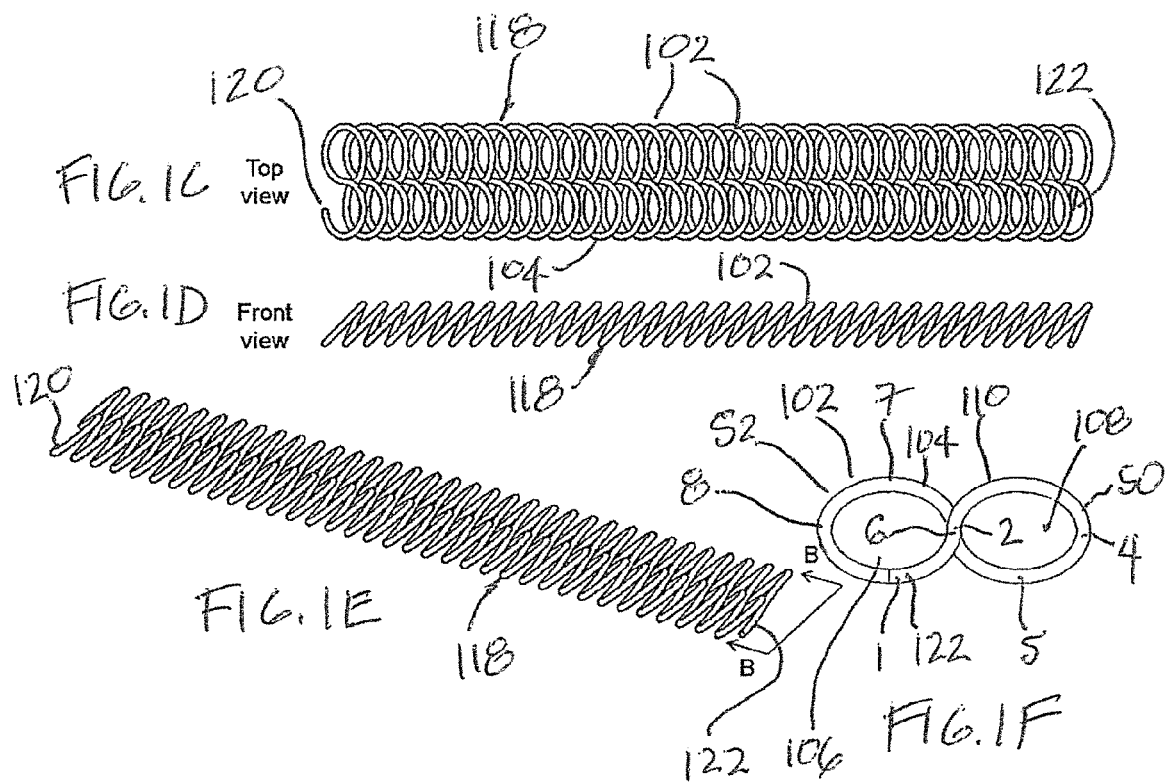

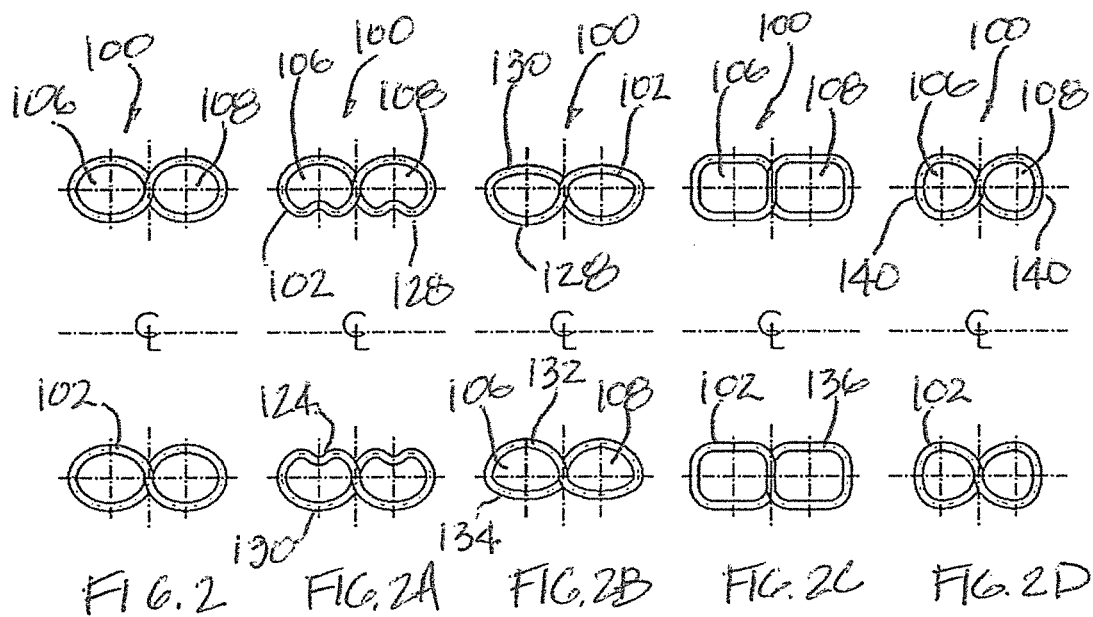
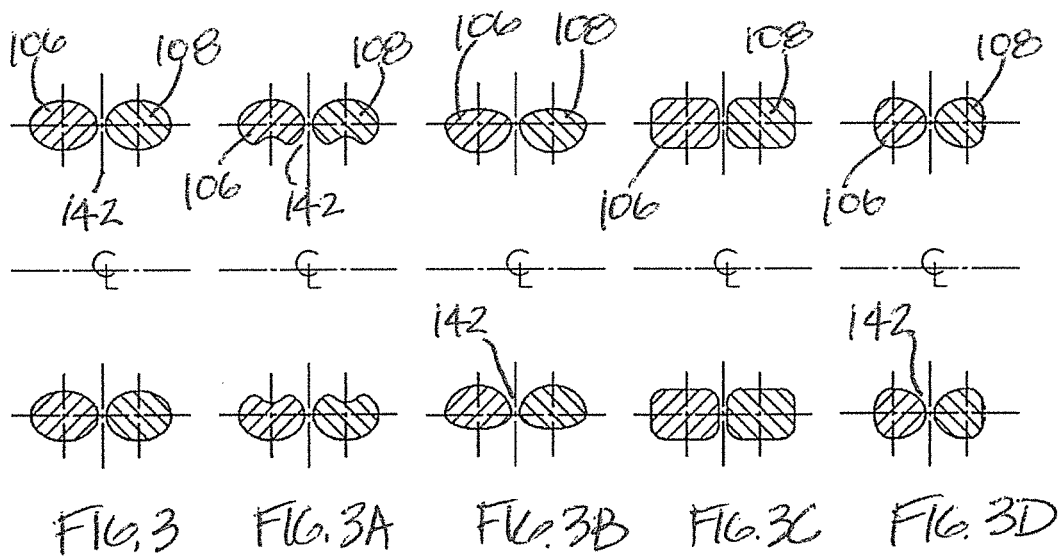

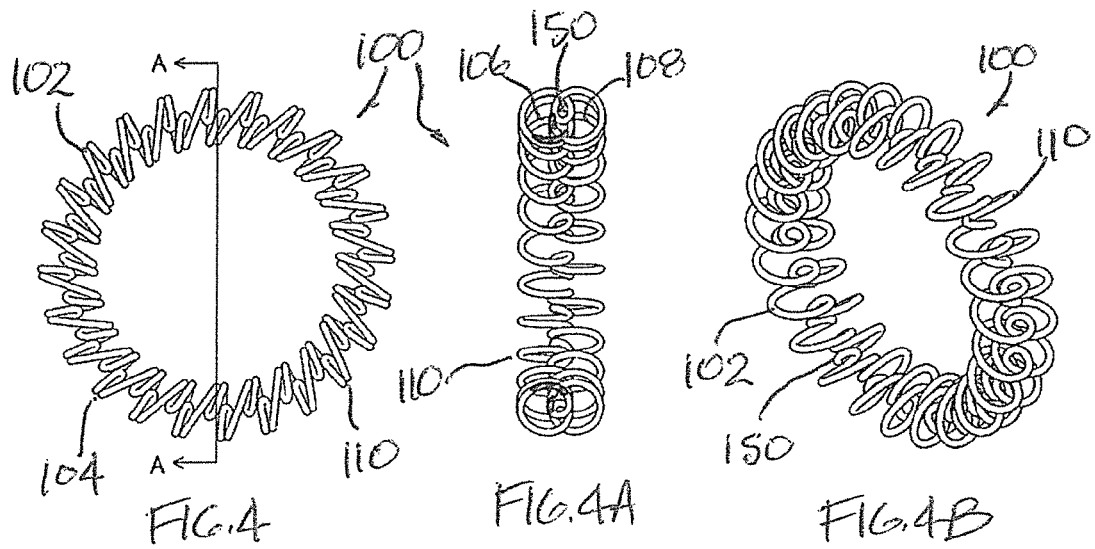
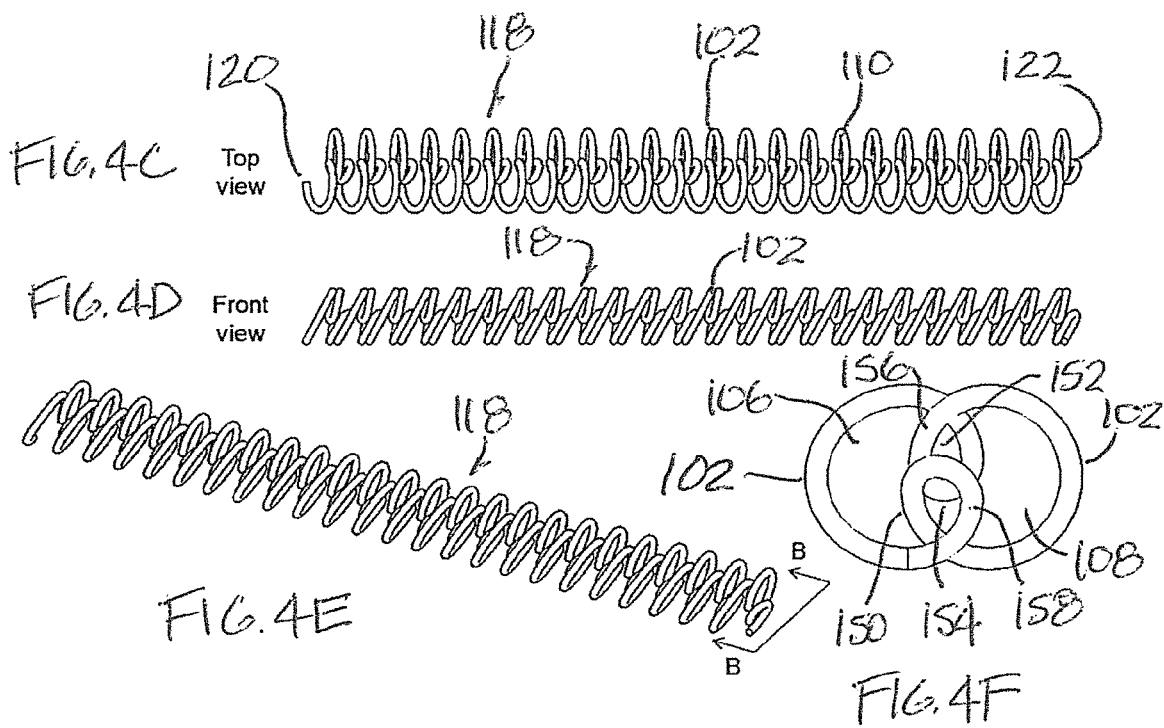

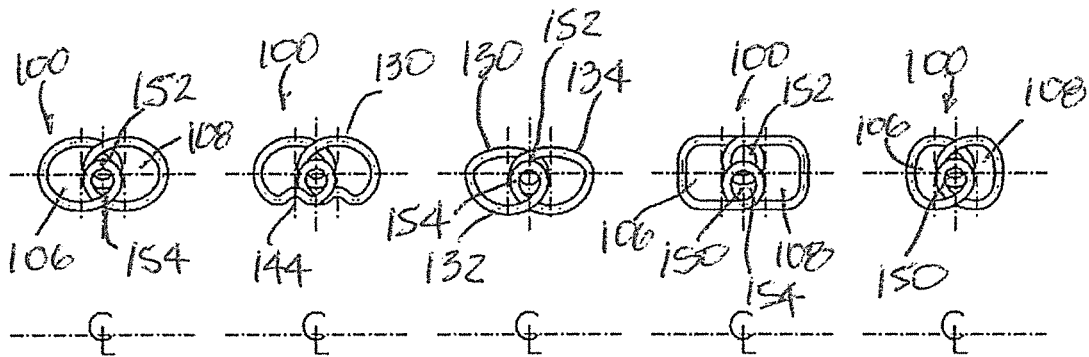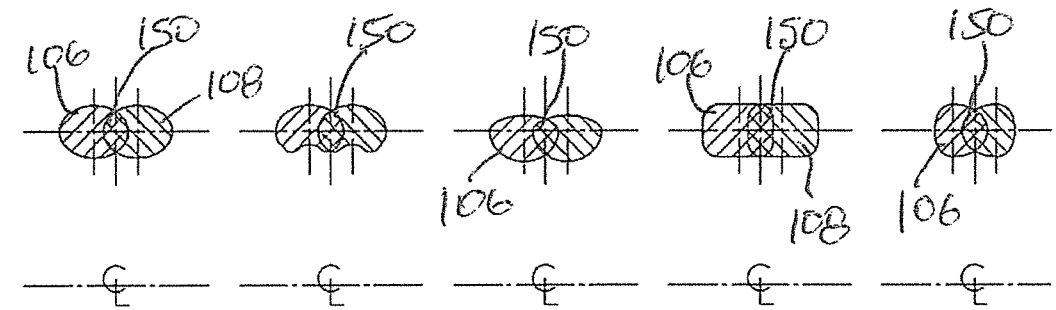
FIG.5  FIG.5A  FIG.5B  FIG.5C  FIG.5D
FIG.6  FIG.6A  FIG.6B  FIG.6C  FIG.6D

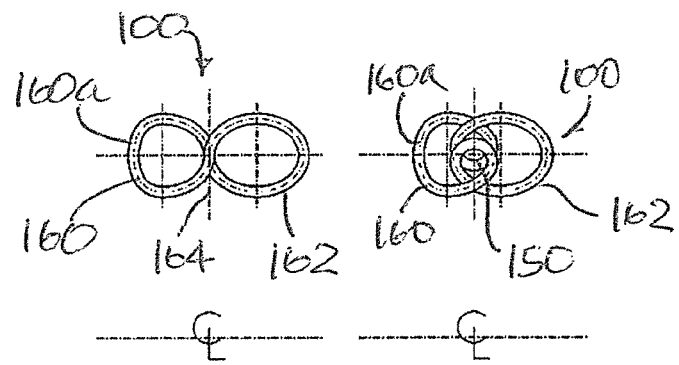
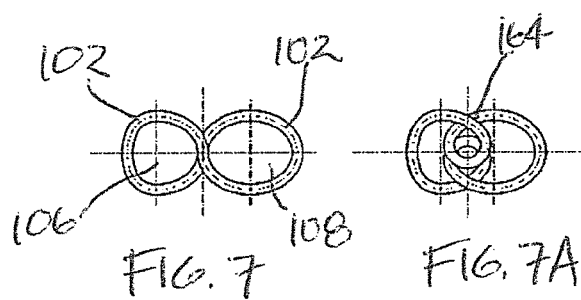
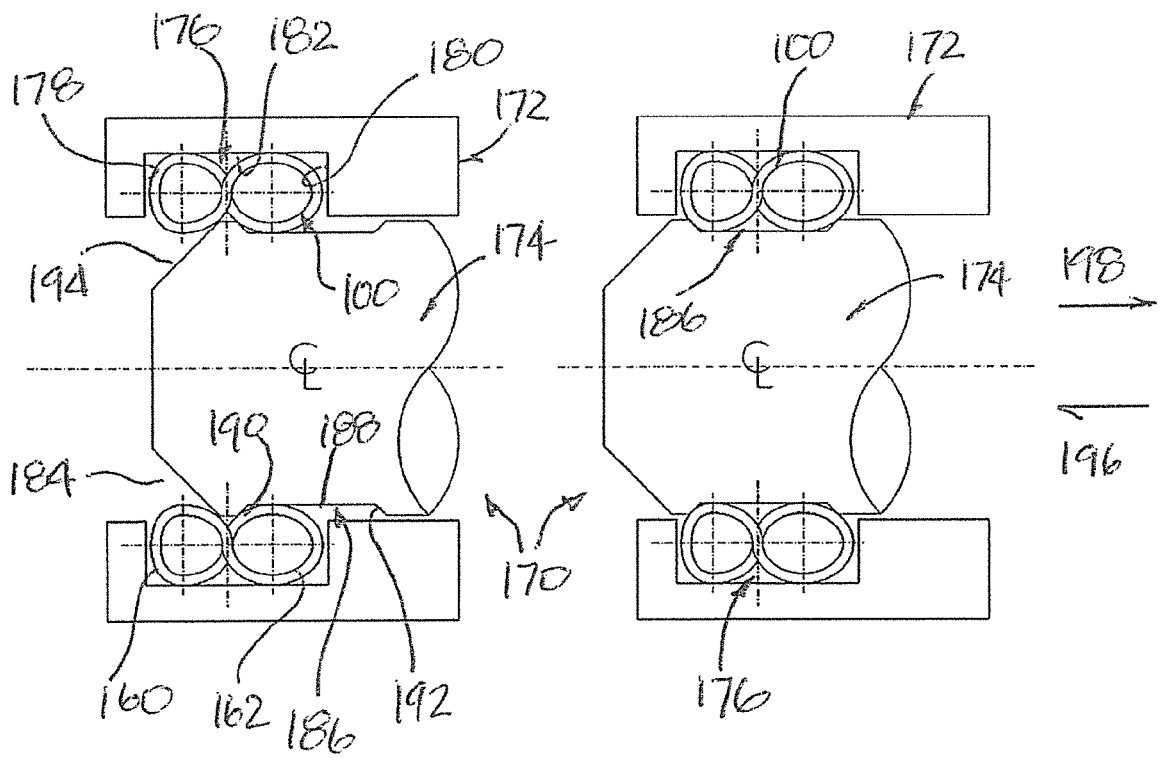
FIG. 8    FIG. 8A

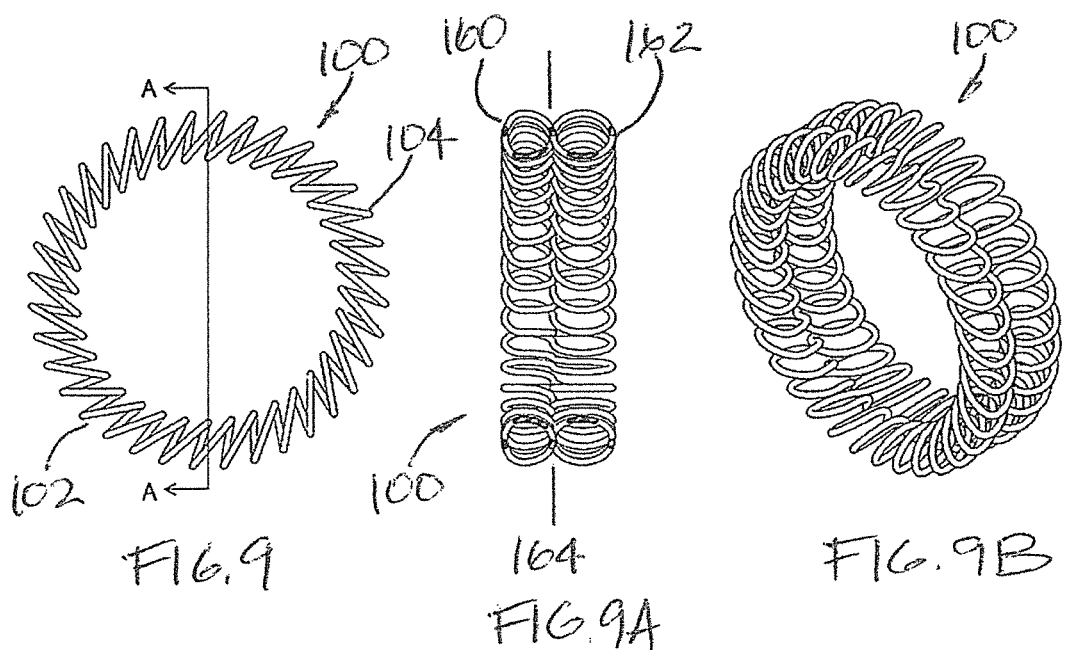
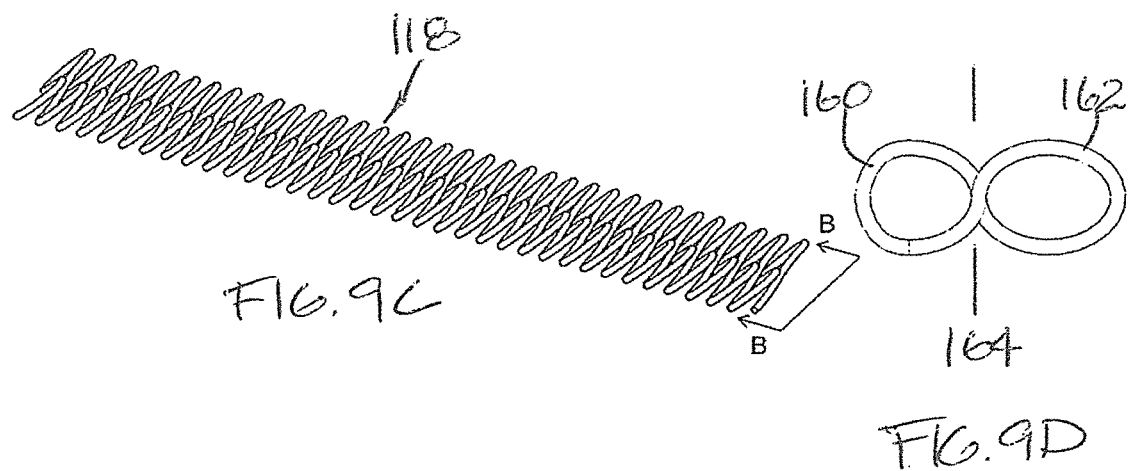

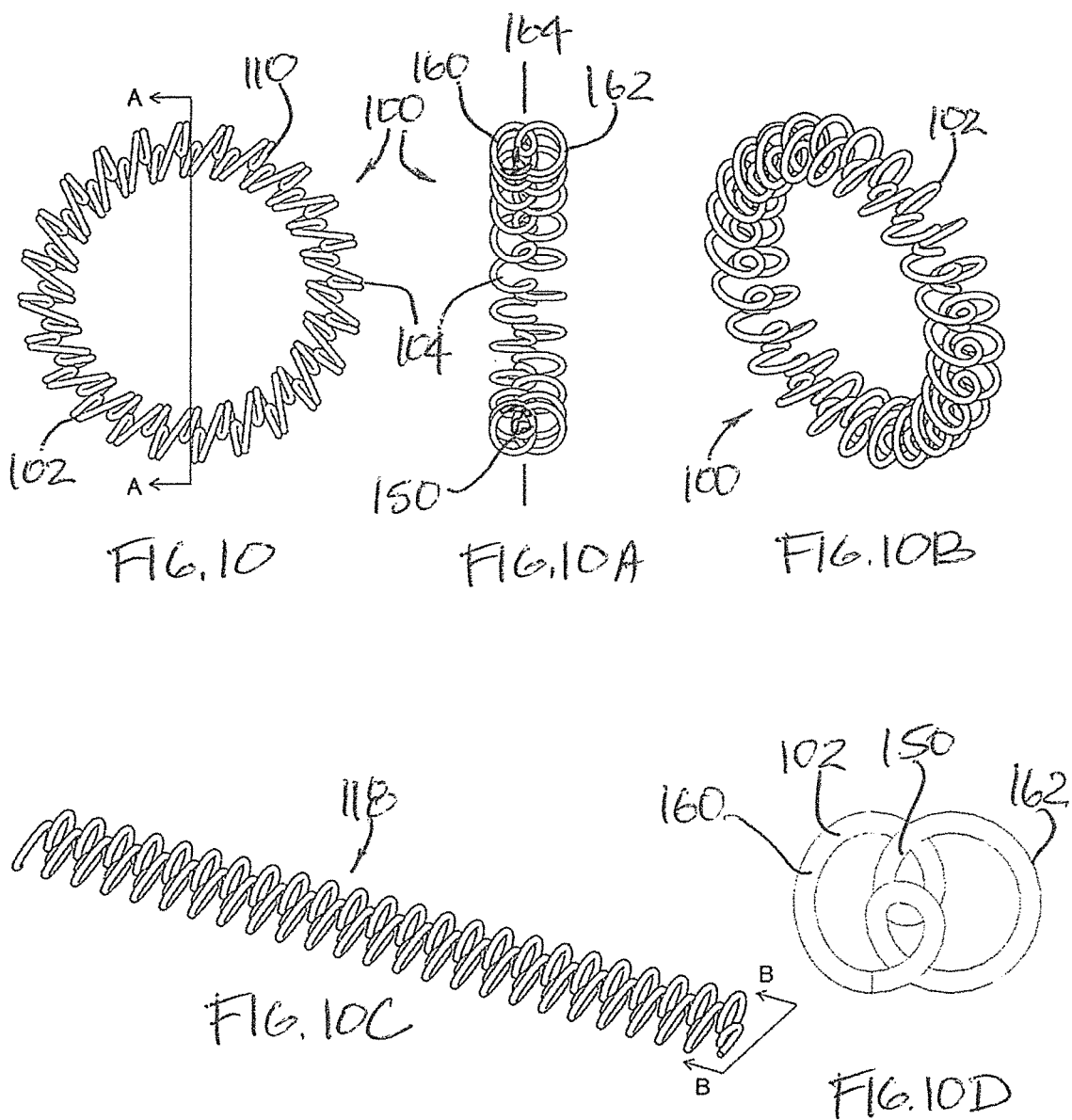

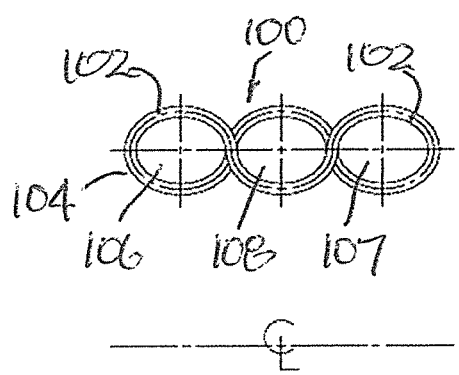
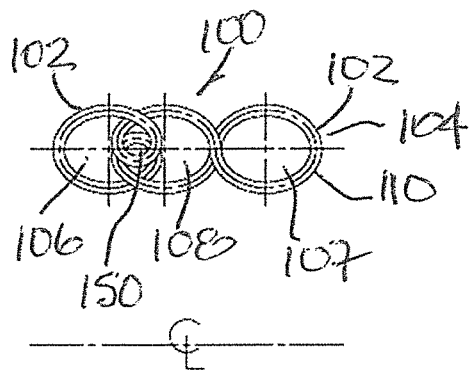
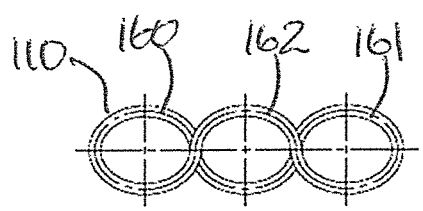
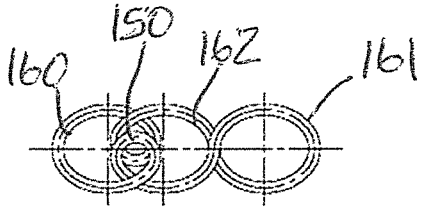
FIG. 11      FIG. 12
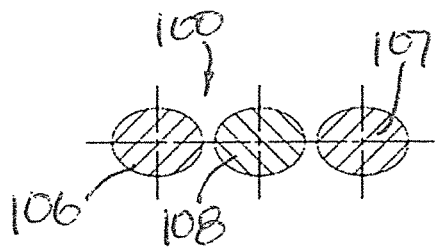
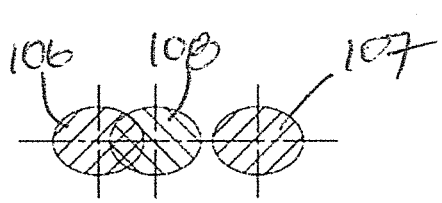
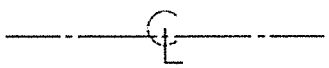
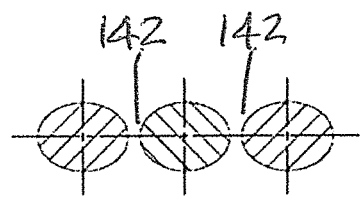
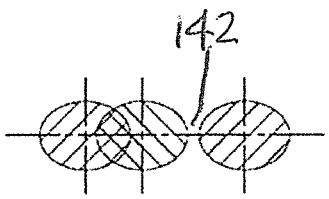
FIG. 13      FIG. 14

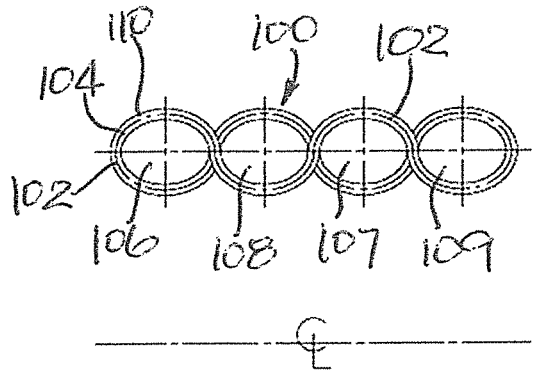
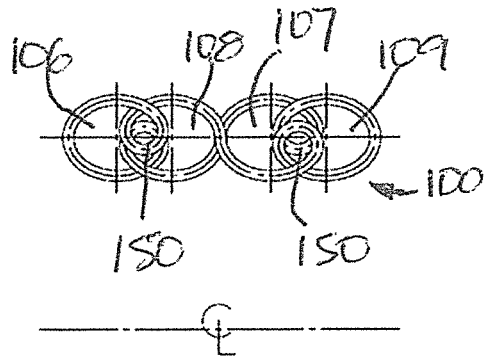
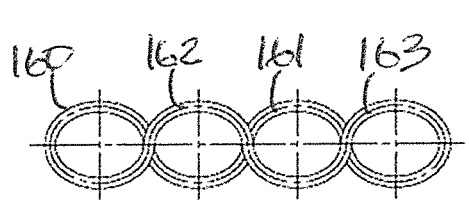
FIG. 15
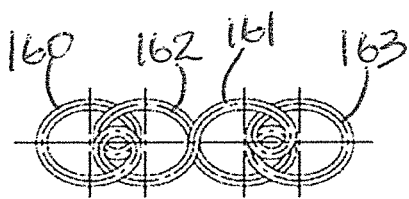
FIG. 16
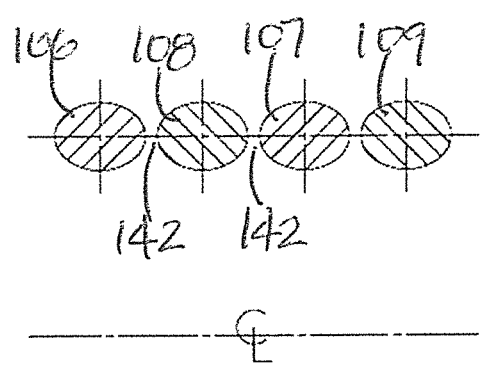
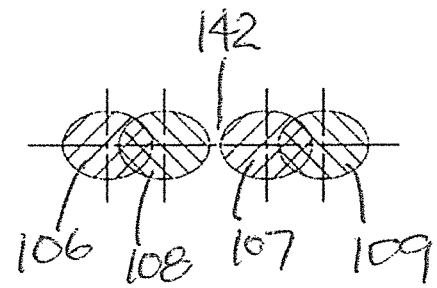
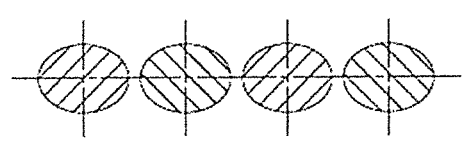
FIG. 17
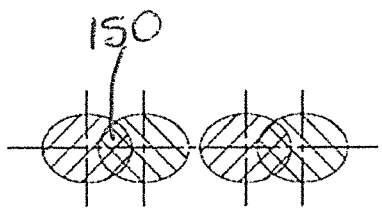
FIG. 18

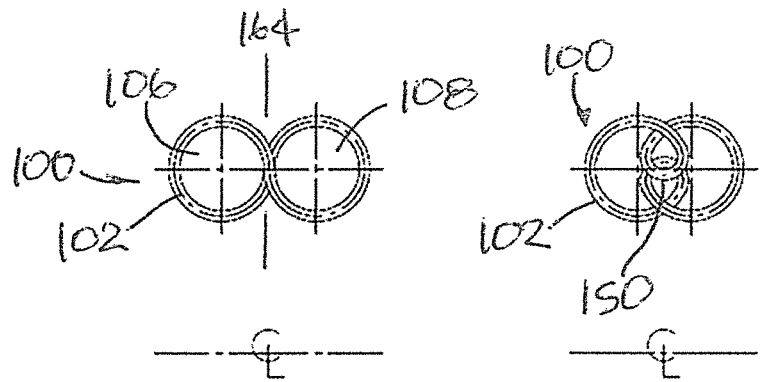
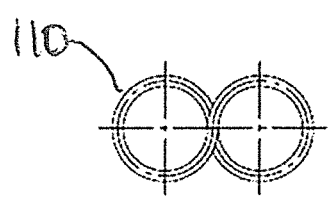
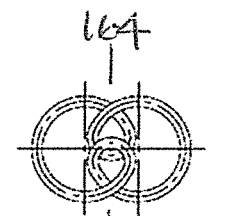
FIG. 19  FIG. 20
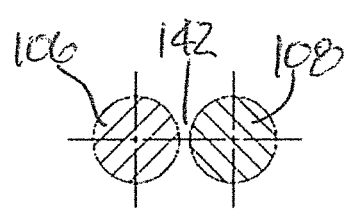
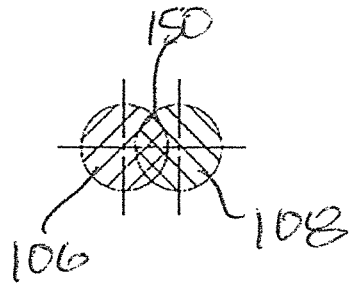
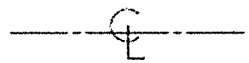
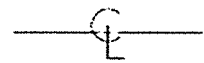
FIG. 21  FIG. 22

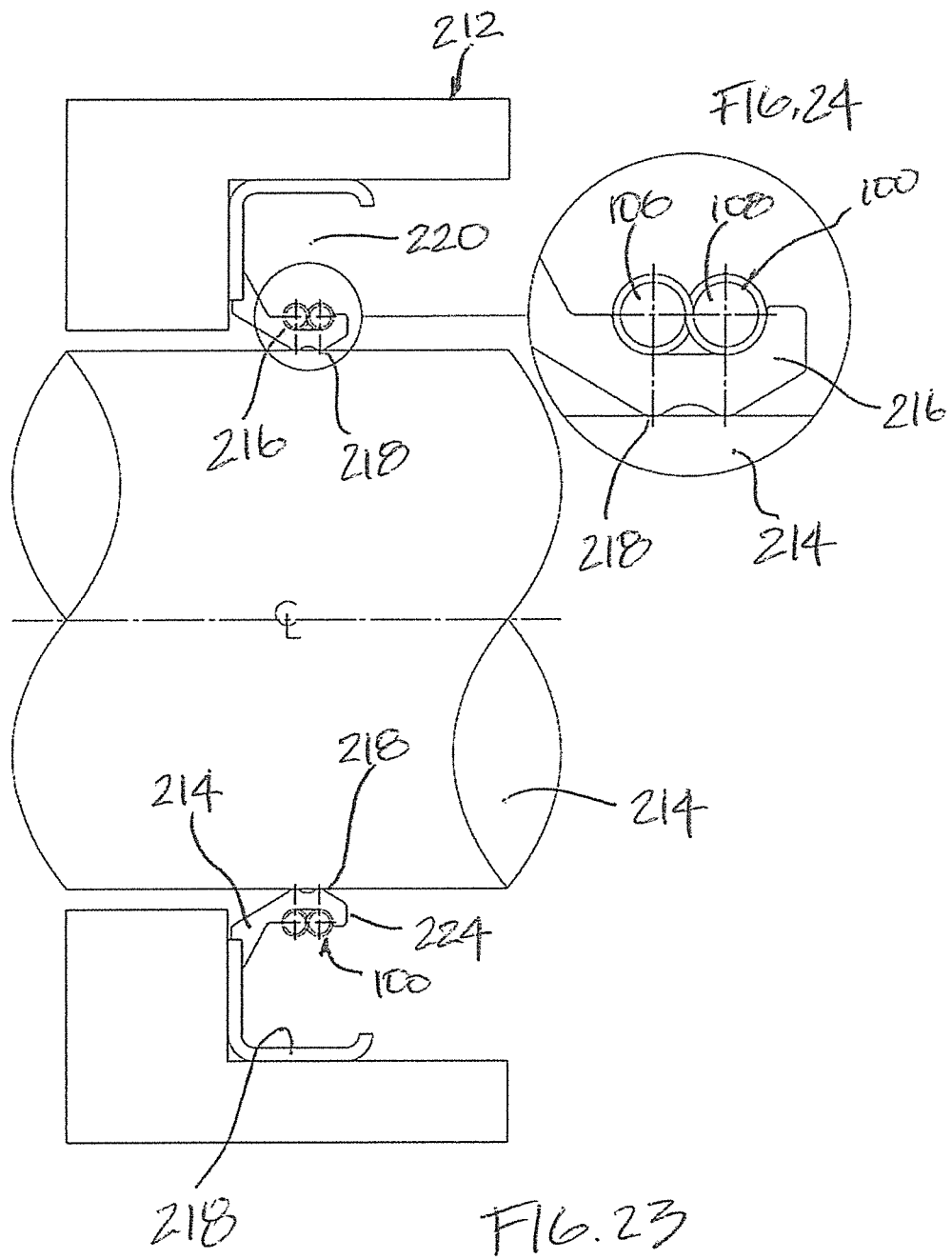

COIL SPRINGS WITH COMPLEX COIL CONFIGURATIONS, ASSEMBLIES WITH COIL SPRINGS, AND RELATED METHODS

FIELD OF THE ART

The present disclosure pertains to the field of coil springs. More specifically, it relates to coil springs having complex coil configurations, connectors and assemblies with coil springs having complex coil configurations, applications with coil springs having complex coil configurations, and related methods.

BACKGROUND

Coil springs are used in several applications such as seal energizers, mechanical connectors and electrical contacts. Coil springs are typically of the expansion and compression types. Another type of coil springs is of the canted coil type, which have coil shapes that are essentially circular, essentially elliptical, partially elliptical or essentially polygonal. These coil shapes, however, may present limitations that, in some applications, result in underutilization of the coil springs or canted coil springs not being considered or spec out for a project.

Coil springs can also include helical type springs, ribbon springs, and leaf springs, among others. Some springs are interchangeable while others can only work if appropriately spec out. Springs may be used for their spring potential, as a medium to connect two components together, or as a medium to transmit electricity or signal.

SUMMARY

The present application describes springs with complex spring configurations or shapes formed by a wire path. The disclosed springs may be used in a number of different applications across a number of different industries.

Exemplary coil springs include a spring length or ring comprising a plurality of interconnected coils comprising a coil axis; each coil being defined by a wire having a wire path that results in a coil cross section that, when viewed along the coil axis, comprises at least a first space and a second space differentiated from each other and each confined by the wire.

The coil spring wherein all the coils can have generally a same first space shape and size and generally a same second space shape and size.

The coil spring wherein the shape of one of the first and second spaces can be one of generally circular, generally elliptical, generally elliptical comprising at least one perimetric perturbation, partially elliptical, and generally polygonal.

The coil spring wherein the first space and second space shapes and sizes can generally be the same.

The coil spring wherein the spring can be a canted coil spring in which the coils are canted along a same direction.

The coil spring wherein the first and second spaces of at least one coil can overlap.

The coil spring wherein all the coils can have generally a same first space shape and size and generally a same second space shape and size.

The coil spring wherein the shape of one of the first and second spaces can be one of generally circular, generally elliptical, generally elliptical comprising at least one perimetric perturbation, partially elliptical, and generally polygonal.

The coil spring wherein the spring can be located in a groove of a housing having a bore. The coil spring can instead be located on a shaft.

The coil spring wherein the spring can bias against an inside flange of a lip seal.

The coil spring can further comprise ends of the coil spring connected to each other thereby generating a closed shape.

The coil spring wherein the closed shape can be one of generally circular, generally elliptical and generally polygonal.

A further feature of the present disclosure is a method for forming a coil spring. The method can comprise coiling a wire to form a plurality of interconnected coils comprising a coil axis, each coil being defined by a wire having wire path that results in a coil cross section that, when viewed along the coil axis, comprises at least a first space and a second space differentiated from each other and each confined by the wire; and repeating the coiling to produce at least three interconnected coils.

The method wherein all the coils can have generally a same first space shape and size and generally a same second space shape and size.

The method wherein the shape of one of the first and second spaces can be one of generally circular, generally elliptical, generally elliptical comprising at least one perimetric perturbation, partially elliptical, and generally polygonal.

The method wherein the first space and second space shapes and sizes can generally the same.

The method can further comprise the step of canting the interconnected coils along a same direction to form a canted coil spring.

The method wherein the first and second spaces of at least one coil can overlap.

The method wherein the coils can have generally the same first space shape and size and generally the same second space shape and size.

The method can further comprise placing the coil spring in a groove of a housing or a pin.

The method can further comprise the step of placing the coil spring in a spring cavity of a lip seal.

The method wherein the ends of the coil spring are connected to each other thereby generating a closed shape, such as a garter spring.

The method wherein the closed shape spring by combining the two ends can have one of generally circular, generally elliptical and generally polygonal.

A yet further feature of the present application is a connector assembly comprising: a housing having a bore; a pin located in said bore of said housing; a groove in said housing or on said pin; a coil spring in said groove to connect said pin to said housing; and wherein said coil spring comprises a plurality of interconnected coils comprising a coil axis, each coil being defined by a wire having a wire path that results in a coil cross section that, when viewed along the coil axis, comprises at least a first space and a second space differentiated from each other and each confined by the wire.

BRIEF DESCRIPTION OF DRAWINGS

These and other features and advantages of the present device, system, and method will become appreciated as the same becomes better understood with reference to the specification, claims and appended drawings wherein:

FIGS. 1, 1A, 1B, 1C, 1D, 1E, and 1F illustrate a coil spring ring and a coil spring length comprising coils with two differentiated spaces each confined by the wire.

FIGS. 2, 2A, 2B, 2C, and 2D show different coil spring rings, similar to that illustrated in FIGS. 1 to 1B but with different ring shaped sections.

FIGS. 3, 3A, 3B, 3C, and 3D show the two differentiated spaces of the coil cross sections of the coil spring rings of FIGS. 2, 2A, 2B, 2C, and 2D, respectively.

FIGS. 4, 4A, 4B, 4C, 4D, 4E, and 4F illustrate a coil spring ring and a coil spring length comprising coils with two differentiated spaces each confined by the wire and with overlapped sections.

FIGS. 5, 5A, 5B, 5C, and 5D show different canted coil spring rings, similar to that illustrated in FIGS. 4 to 4B but with different ring shaped sections.

FIGS. 6, 6A, 6B, 6C, and 6D show the two differentiated spaces of the coil cross sections of the canted coil spring rings of FIGS. 5, 5A, 5B, 5C, and 5D, respectively.

FIGS. 7 and 7A illustrate coil spring rings similar to those illustrated in FIGS. 1, 1A, and 1B and 4, 4A, and 4B, respectively, but with different ring shaped sections.

FIGS. 8 and 8A show an assembly at different stages comprising a housing and a pin at least mechanically engaged to the housing by a canted coil spring ring having a complex configuration.

FIGS. 9, 9A, 9B, 9C, and 9D illustrate a coil spring ring and length similar to those shown in FIG. 7 that assimilate to such canted coil spring ring.

FIGS. 10, 10A, 10B, 10C, and 10D illustrate a coil spring ring and length similar to those shown in FIG. 7A that assimilate to such canted coil spring ring.

FIG. 11 illustrates a coil spring ring with different ring shaped sections.

FIG. 12 illustrates a coil spring ring with different ring shaped sections.

FIG. 13 shows three differentiated spaces of the coil cross section of the coil spring ring of FIG. 11.

FIG. 14 shows three differentiated spaces of the coil cross section of the coil spring ring of FIG. 12.

FIG. 15 illustrates a coil spring ring with different ring shaped sections.

FIG. 16 illustrates a coil spring ring with different ring shaped sections.

FIG. 17 shows four differentiated spaces of the coil cross section of the coil spring ring of FIG. 15.

FIG. 18 shows four differentiated spaces of the coil cross section of the coil spring ring of FIG. 16.

FIG. 19 illustrates a coil spring ring with different ring shaped sections.

FIG. 20 illustrates a coil spring ring with different ring shaped sections.

FIG. 21 shows the two differentiated spaces of the coil cross section of the coil spring ring of FIG. 19.

FIG. 22 shows two differentiated spaces of the coil cross section of the coil spring ring of FIG. 20.

FIGS. 23-24 show a spring energized seal assembly mounted on a shaft.

DETAILED DESCRIPTION

Figure 25:
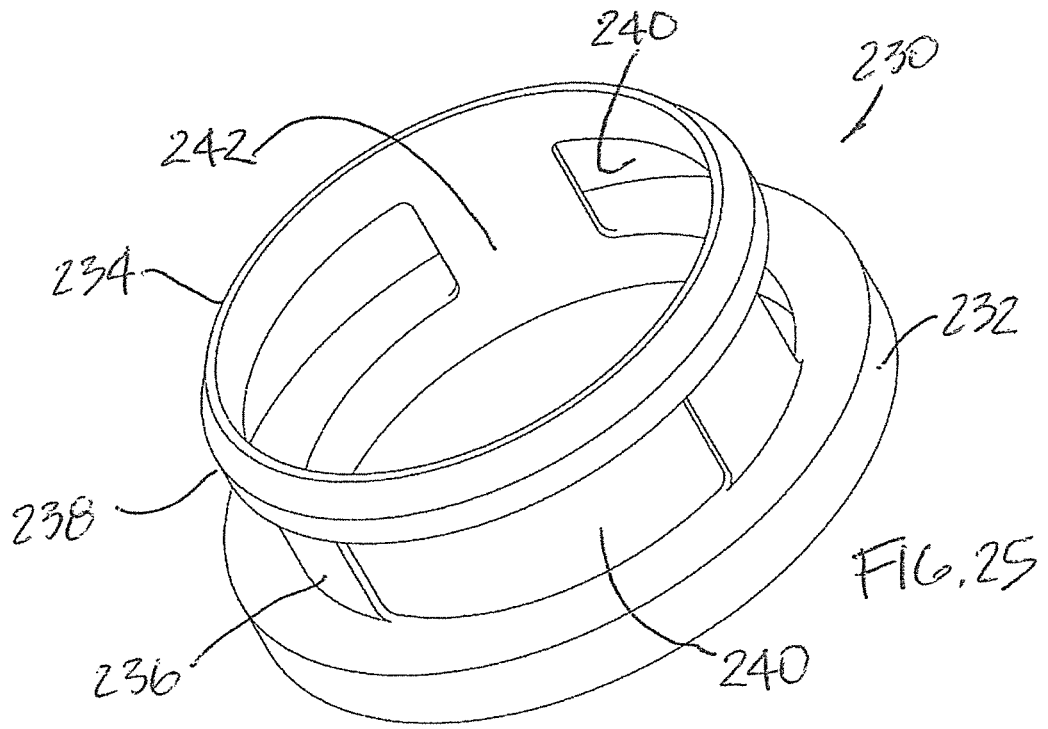
FIGS. 25-26 show a housing and a spring ring mounted on the housing.

The detailed description set forth below in connection with the appended drawings is intended as a description of the presently preferred embodiments of coil springs, applications of coil springs, and related methods provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

The present invention is directed to coil springs and to systems, devices, and methods involving coil springs, such as axial and radial canted coil springs, compression and expansion springs, comprising coil springs with relatively complex coil cross sectional geometries or configurations that can offer advantages over conventional helical and canted coil springs, such as those disclosed in U.S. Pat. No. 4,655,462. For example, the canted coil springs in accordance with aspects of the present disclosure have increased coil width to coil height ratio, increased areas of contact and increased spring force, among others. The increased area of contact, for example, decreases the spring's resistance and allows more current or electrical flow across the spring. Thus, canted coil springs provided herein can help overcome limitations that can otherwise restrict or spec out the use of prior art coil springs.

Coil springs comprising a plurality of interconnected coils each being defined by a wire path that results in a coil cross section that, when viewed along the coil axis, comprises at least a first space and a second space differentiated from each other and each confined by the wire are disclosed. The disclosed coil springs have a wire path that undulates and extends beyond the boundary of one space and into a second, third or fourth space to form coils that aligned side-by-side-by-side, and so forth as the case may be. The disclosed coil springs may be used in a number of applications, including in a seal, in a connector, and in a fastener, to name a few non-limiting examples.

With reference now to FIGS. 1 to 1B, a canted coil spring ring 100 are illustrated in side, cross-sectional, and perspective views, respectively. FIG. 1A is a cross-sectional end view of FIG. 1 taken along line A-A. The spring ring 100 may be formed by joining two ends of a spring length, such as by welding the ends or staggering the ends to physically engage the coils. As shown, the spring ring 100 comprises a plurality of interconnected coils 102 each being defined by a wire path 104 that results in a coil cross section that, when viewed along the coil axis and is shown in FIG. 1A, comprises at least two differentiated spaces 106, 108 each confined by the wire 110 used to form or coil the spring 100. The shape of the two spaces 106, 108, which may be referred to as a first coil space 106 and a second coil space 108, is defined by the wire path 104 of the wire 110. As shown, the two spaces 106, 108 are located side-by-side. The coils 102 are also canted along the same direction when viewed along the coil axis and form a canted coil spring ring 100. In other examples, the coils are not canted along the same direction and form either a compression or expansion spring or both.

In one example, the two differentiated spaces 106, 108 of the coils 102 of the coil spring shown in FIGS. 1-1B are generally elliptical and form a figure eight shape. The two differentiated spaces are defined by different coil sections of each coil of the plurality of coils of the canted coil spring 100. For example, the coil path 104 has a first coil direction 112 and curved back along a second direction 114 and so forth. Each direction has a sharp bend or curve 116, such as a bend with a small bending radius, generally along the middle of the two directions to delineate the boundaries between the two differentiated spaces 106, 108.

FIG. 1C shows a top view of a spring length 118 having a plurality of coils 102 and two ends 120, 122 that when joined form the spring ring of FIGS. 1-1B.

FIG. 1D is a side view and FIG. 1E is a perspective view of the spring length 118 of FIG. 1C.

FIG. 1F is an end view of the spring length 118 of FIG. 1E taken along line B-B, which shows two differentiated spaces 106, 108 defined by the path 104 of the wire 110. From the view shown, the spring 118 is understood to include a plurality of coils 102 with each coil having a figure-eight shape. The spring may also be understood to include two coils 102 located side-by-side and interconnected, such as formed by a continuous wire, so as to resemble a figure-eight shape. In other examples, the each coil 102, or two coils connected side-by-side, have a different shape, such as a modified figure-eight shape.

Again with reference to FIG. 1F, the figure eight shape coil 102 or the two coils 102 that join to from a figure eight shape may be formed by coiling or bending a wire from point 1, angling the wire to point 2 and then bending the wire back to points 3, 4 and 5. When the wire path returns to point 6, which is subjacent point 2, a complete coil 50 having a bounded space 108 is formed. However, the path of the wire extends outside of the coil 50 towards points 7 and 8 and so forth to form a second coil 52 having a second bounded space 106 that is adjacent the first coil 50 and wherein the two coils 50, 52 are formed from a continuous wire with coil paths that extend beyond the boundaries of each respective coil. Other coil springs disclosed herein have similar complex coil paths and can have additional coil paths for forming overlapping sections and for forming additional coils in a side-by-side configuration. Canted coil spring described herein may be canted along the major axis, longer of two axes, or along the minor axis, shorter of two axes.

Wire types usable herein to form the spring 118 and the spring ring 100 include copper, copper alloy, aluminum, aluminum alloy, gold, gold alloy, silver, silver alloy, brass, and brass alloy. Additional wires include steel material, such as medical grade stainless steel, titanium, noble metals such as platinum or conventional implantable grade materials with noble metal coatings, such as platinum over stainless steel. The wire may also be a multi-metallic wire in which a base core material is surrounded by one or more other materials. For example, the inner core can be made from copper and the outer layer from stainless steel or can have the reverse arrangement with copper on the outside. In some examples, the spring has an inner core and an outer layer having different material compositions with the outer layer comprising at least one of platinum, iridium, rhodium, rhenium, ruthenium and palladium. The outer layer should have sufficient thickness to provide the spring with an electrical resistance that is within 20% or less of a spring made entirely of at least one of platinum, iridium, rhodium, rhenium, ruthenium and palladium. For electrical connector applications, the spring may be used with a housing and a pin or shaft made from stainless steel type 316L, MP35N, platinum-iridium, titanium or other conductive materials, including being plated or coated with a highly conductive metal, such as silver, copper, gold, and their alloys.

FIG. 2 shows a canted coil spring ring 100 with a ring centerline, $\mathcal{C}_L$. The spring ring 100 is similar to spring ring 100 illustrated in FIGS. 1 to 1B, except the shape of the two differentiated spaces 106, 108 being generally a modified elliptical shape, such as being longer or wider than the elliptical shape of FIG. 1F.

FIG. 2A shows a spring ring 110 with a ring centerline, $\mathcal{C}_L$, and having generally elliptical coils 102. The spring ring 100 is similar to spring ring 100 illustrated in FIGS. 1 to 1B, except the shape of coils 102 defining the two differentiated spaces 106, 108 being generally a modified elliptical shape and comprising at least one perimetric perturbation 124. As shown, the perimetric perturbation 124 is located on the inside diameter 128 of the spring ring 100 and on each coil. In other examples, the perimetric perturbation 124 is located on the outside diameter 130 of the spring ring and the perimetric perturbation may not be incorporated with each coil.

FIG. 2B shows a spring ring 100 with a ring centerline, $\mathcal{C}_L$, and having spring coils 102 that are partially elliptical. The coils 102 define two differentiated spaces 106, 108 and wherein the coils along the inner diameter 128 of the ring have conventional elliptical shaped curvatures 132 whereas the coils along the outer diameter 130 have flattened elliptical shaped curvatures 134. In other examples, the flattened curvatures are positioned along the inner diameter 128 and the more conventional curvatures along the outer diameter 130.

FIG. 2C shows a spring ring 100 with a ring centerline, $\mathcal{C}_L$, and having coils 102 that are generally polygonal. The spring ring 100 is similar to spring ring 100 illustrated in FIGS. 1 to 1B, except the shape of coils 102 defining the two differentiated spaces 106, 108 being generally rectangular or more broadly polygonal 136. In other examples, the coils 102 are generally square or have more or less sides than shown.

FIG. 2D shows a spring ring 100 with a ring centerline, $\mathcal{C}_L$, and having spring coils 102 that are partially elliptical. The coils 102 defining two differentiated spaces 106, 108 and wherein the coils along the outer side edges 140 are somewhat flattened from a typical end curvature of an elliptical shaped coil. The shapes being generally as described and commonly accepted in the industry even if not truly round, oval, etc., although the latter is understood to be within the scope of the former.

FIG. 3 show the areas defined by the two differentiated spaces 106, 108 of the cross sections of the coils 102 of FIG. 2. For the most part, the two areas have a figure eight shape with a gap or space 142 separating them. Thus, aspects of the disclosed canted coil spring ring 100 are understood to comprise a spring coil comprising at least two coils positioned side-by-side and having a gap or space 142 therebetween but wherein the coils are formed from a continuous wire with wire paths that extend beyond the boundary of each respective coil of the at least two coils. The disclosed canted coil spring rings each comprises a coil that defines at least two areas with at least two differentiated spaces 106, 108 with a gap 142 between the at least two areas. As shown, the spring ring of FIG. 2 and the areas produced by the coils have individual coils and areas that occupy more space than a comparable prior art coil with a single area, i.e., no multiple differentiated spaces located side-by-side. The larger area per coil layer have increased coil width to coil height ratio, increased areas of contact with adjacent surfaces and increased spring force, among others.

FIG. 3A show the areas defined by the two differentiated spaces 106, 108 of the cross sections of the coils 102 of FIG. 2A. For the most part, the two areas have a figure eight shape with a gap or space 142 separating them and with indented sections formed by the perimetric perturbations 124 of FIG. 2A.

FIGS. 3B-3D show the areas defined by the two differentiated spaces 106, 108 of the cross sections of the coils 102 of FIGS. 2B-2D, respectively. For the most part, the two areas have a figure eight shape with a gap or space 142 separating them and with the figure eight shape being modified elliptical shapes or polygonal shapes.

With reference now to FIGS. 4 to 4B, a canted coil spring ring 100 are illustrated in side, cross-sectional, and perspective views, respectively. FIG. 4A is a cross-sectional end view of FIG. 4 taken along line A-A. The spring ring 100 may be formed by joining two ends of a spring length, such as by welding the ends or staggering the ends to physically engage the coils. As shown, the spring ring 100 comprises a plurality of interconnected coils 102 each being defined by a wire path 104 that results in a coil cross section that, when viewed along the coil axis, comprises at least two differentiated spaces 106, 108 each confined by the wire 110 used to form or coil the spring 100. The shape of the two spaces 106, 108 is defined by the wire path 104 of the wire 110. As shown, the two spaces 106, 108 are located side-by-side. The coils 102 are also canted along the same direction when viewed along the coil axis and form a canted coil spring ring 100.

In one example, the two differentiated spaces 106, 108 of the coils 102 of the coil spring shown in FIGS. 4-4B are generally circular and partially overlapped along a common central section 150. The two differentiated spaces are defined by different coil sections of each coil of the plurality of coils of the canted coil spring 100. In other words, for each complete coil layer, with wires extending in both directions to form a bounded loop, two differentiated spaces are formed. Thus, the canted coil spring ring 100 shown in FIGS. 4-4B comprises a plurality of interconnected coils with each being defined by a wire path that results in a coil cross section comprising, when viewed along the coil axis, at least two differentiated spaces each confined by the wire. As shown and further discussed below with reference to FIG. 4F, the wire path also forms smaller loops between the two coils to form a first small differentiated space 152 and a second small differentiated space 154.

FIG. 4C shows a top view of a spring length 118 having a plurality of coils 102 and two ends 120, 122 that when joined form the spring ring of FIGS. 4-4B.

FIG. 4D is a side view and FIG. 4E is a perspective view of the spring length 118 of FIG. 4C.

FIG. 4F is an end view of the spring length 118 of FIG. 4E taken along line B-B, which shows two differentiated spaces 106, 108 defined by the path 104 of the wire 110. From the end view shown, the common central section 150 shows two tight coiled sections 156, 158 that form the first small space 152 and the second small space 154, respectively. The tight coiled sections are formed from the same wire path employed to form the two coils 102 and can be understood as tight 360 degree coil paths formed between two adjacent coils 102. If the coils 102 are instead viewed as a single figure eight coil, then the tight coiled sections can be understood as tight 360 degree coil paths formed within a figure eight coil. As shown, the spring comprises a plurality of coils 102 with each coil being generally circular and partially overlapping an adjacent coil. Viewed differently, the spring shows a plurality of generally circular coils located side-by-side with some overlapping. Thus, in a coil spring having a plurality of coil layers, each coil layer of the present disclosure is understood as having greater surface contact areas and larger width to height ratio than a traditional coil spring.

FIG. 5 shows a canted coil spring ring 100 with a ring centerline, ℄. The spring ring 100 is similar to the spring ring 100 illustrated in FIGS. 4 to 4B and 4F, except the shape of the two differentiated spaces 106, 108 being generally a modified elliptical shape, such as being more elongated than the elliptical shape of FIG. 4F. From the end view shown, the common central section 150 shows two tight coiled sections 156, 158 that form a first small space 152 and a second small space 154, respectively.

FIG. 5A shows a spring ring 100 with a ring centerline, ℄, and having generally elliptical coils 102. The spring ring 100 is similar to spring ring 100 illustrated in FIGS. 1 to 1B, except the shape of coils 102 defining the two differentiated spaces 106, 108 being generally elliptical comprising at least one perimetric perturbation 124 (FIG. 5A) on each coil 102. As shown, the perimetric perturbation 124 is located on the inside diameter 128 of the spring ring 100. In other examples, the perimetric perturbation 124 is located on the outside diameter 130 of the spring ring. The common central section 150 is similar to that of FIG. 5. In other examples, not all coil of the spring ring has a perimetric perturbation 124.

FIG. 5B shows a spring ring 100 with a ring centerline, ℄, and having spring coils 102 that are partially elliptical. The coils 102 defining two differentiated spaces 106, 108 and wherein the coils along the inner diameter 128 of the ring have conventional elliptical shaped curvatures 132 whereas the coils along the outer diameter 130 have flattened elliptical shaped curvatures 134. In other examples, the flattened curvatures are positioned along the inner diameter 128 and the more conventional curvatures along the outer diameter 130. Because of the flattened coil sections, the common central section 150 shows additional overlapping between the two tight coiled sections 156, 158 that form greater overlapping between the first small space 152 and the second small space 154 than that of FIGS. 5 and 5A.

FIG. 5C shows a spring ring 100 with a ring centerline, ℄, and having coils 102 that are generally polygonal. The spring ring 100 is similar to spring ring 100 illustrated in FIGS. 1 to 1B, except the shape of coils 102 defining the two differentiated spaces 106, 108 being generally rectangular or more broadly polygonal 136. In other examples, the coils 102 are generally square or have more or less sides than shown. From the end view shown, the common central section 150 shows two tight coiled sections 156, 158 that form a first small space 152 and a second small space 154, respectively.

FIG. 5D shows a spring ring 100 with a ring centerline, ℄, and having spring coils 102 that are partially elliptical. The coils 102 defining two differentiated spaces 106, 108 and wherein the coils along the outer side edges 140 are somewhat flattened from a typical end curvature of an elliptical shaped coil. The shapes being generally as described and commonly accepted in the industry even if not truly round, oval, etc., although the latter is understood to be within the scope of the former. The common central section 150 is similar to that of FIG. 5.

FIG. 6 show the areas defined by the two differentiated spaces 106, 108 of the cross sections of the coils 102 of FIG. 5. For the most part, the two areas have a figure eight shape with an overlapped common central section 150. Thus, aspects of the disclosed canted coil spring ring 100 are understood to comprise a spring coil comprising at least two coil sections positioned side-by-side and having a common overlapped central section. The disclosed canted coil spring ring comprises a coil that defines at least two area sections with at least two differentiated spaces 106, 108 with a common central section 150. As shown, the spring ring of FIG. 5 and the areas produced by the coils (FIG. 6) have individual coils and areas that occupy more space than a comparable prior art coil with a single area, i.e., with no multiple differentiated spaces located side-by-side. The larger area per coil layer have increased coil width to coil height ratio, increased areas of contact with adjacent surfaces and increased spring force, among others. The coils are also understood to be formed by a wire path made from a single wire that extends beyond a boundary of each respective coil, when viewing the figure eight shape as two separate coils. If viewed as a single coil with a figure eight shape with overlapping, the complex coil is understood to be formed by a wire path made from a single wire that has sharp tight radius turns and reduced coil sections within the complex coil.

FIG. 6A shows the areas defined by the two differentiated spaces 106, 108 of the cross sections of the coils 102 of FIG. 5A. For the most part, the two areas have a figure eight shape with a common overlapped central section 150 and with indented sections formed by the perimetric perturbations 124 of FIG. 5A.

FIGS. 6D-6F show the areas defined by the two differentiated spaces 106, 108 of the cross sections of coils 102 of FIGS. 5B-5D, respectively. For the most part, the two areas have a figure eight shape with a common overlapped central section 150 and with the figure eight shape being modified elliptical shapes or polygonal shapes.

FIGS. 7 and 7A illustrate canted coil spring rings 100 similar to those illustrated in FIGS. 2-2D and 5-5D, respectively, with some differences. With reference to FIG. 7, the side-by-side coils 102 have two different coil shapes. In particular, the first coil side 160 has a flattened side contour 160a, modified from a typical elliptical shape. The second coil side 162 has a more traditional elliptical shape. Thus, the two differentiated spaces 106, 108 produced by the coils of FIG. 7 have different shaped areas or different shaped spaces. Said differently, the two coil sections are not symmetrical about a radial centerline 164.

FIG. 7A shows two side-by-side coils 102 having two different coil shapes. In particular, the first coil side 160 has a flattened side contour 160a, modified from a typical elliptical shape. The second coil side 162 has a more traditional elliptical shape. Thus, the two differentiated spaces 106, 108 produced by the coils of FIG. 7A have different shaped areas or different shaped spaces and are non-symmetrical along the radial centerline 164. Also shown is the common overlapped central section 150, which in the embodiment shown is symmetrical about the radial centerline 164.

As described, canted coil spring rings according to the present disclosure is understood to provide an increased coil width to coil height ratio, which may be beneficial in cases where the groove geometry is predefined and cannot be accommodated by a regular caned coil spring. The disclosed canted coil spring rings can also provide an increased area of contact, which may reduce the number of coil springs needed in certain conductive applications. Moreover, given a wire diameter, a coil height and a spring deflection, the disclosed canted coil spring rings may also provide an increased spring force. Thus, the coil springs having complex coil configurations disclosed herein provide advantages over prior art coil springs with without coils in a side-by-side configuration from a continuous coil wire. In other words, the present disclosure is understood to be directed to coil springs having at least two coils that are located side-by-side and formed by a single continuous wire and wherein the coil spring with two side-by-side coils provide advantages over prior art coil spring with only a single row of coils. For example, the present coil springs with complex coil configurations provide an increased area of contact over prior art coil springs.

FIGS. 8 and 8A show a connector 170 at different stages of assembly. Alternatively, FIG. 8 represents one method for using a connector 170 and FIG. 8A represents another method for using the connector 170. As shown, the connector or assembly 170 comprises a housing 172 and a pin, rod, or shaft 174 mechanically engaged to one another via the canted coil spring ring 100, such as the spring ring illustrated in FIG. 7. The housing has a housing groove 176 comprising two sidewalls 178, 180 and a bottom wall 182 located therebetween. The two housing groove sidewalls 178, 180 are preferably orthogonal to the housing lengthwise axis and the housing groove is preferably deeper than 50% of the length of the coil height, which is understood to be shorter than the other axis, i.e., the coil width. In other examples, the groove depth is less than 50% of the length of the coil height. The pin 174 has a pin groove 186 comprising a groove bottom 188 and two sidewalls 190, 192 and a tapered insertion end 194. The two sidewalk of the pin grooves are preferably tapered. As shown, the two sidewalls 190, 192 diverge in the direction away from the pin centerline. In other embodiments, the pin groove and the housing groove may have different groove geometries.

In the example shown, the spring 100 is housing mounted in that prior to insertion of the pin 174 into the bore 184 of the housing, the spring 100 is positioned or located in the housing groove 176. In other examples, the spring 100 is mounted in or on the pin groove 186 prior to insertion of the pin into the bore of the housing.

A first relative position between the housing 172 and the pin 177 (FIG. 8), such as moving the pin in the first direction 196 while holding the housing steady or while moving the housing in the second direction 198, will cause the two components to engage by capturing the second coil side 162 of the spring 100 between the two grooves 176, 186. At this juncture, the pin will have a first removal force when attempting to retract the pin in the opposite direction, such as the second direction 198 while holding the housing steady. This first removal force is established or set by the second coil side 162 of the spring only. The connector is therefore understood to be a latching connector in that the pin can separate, such as disconnect, from the housing. The connector may be used in the present configuration with only the second coil side 162 of the coil spring 100 captured by the common groove, which is understood to be defined by the housing groove 176 and the pin groove 186.

FIG. 8A shows the pin 174 further moved in the first direction 196 while holding the housing 172 steady to capture both the first coil side 160 and the second coil side 162 of the spring 100 with the coils in a side-by-side configuration in the common groove. Thus, the connector may be considered or called a multi-stage connector in that one spring may be used to require multiple engaging and disconnecting steps. In the position shown, the pin has a second removal force when retracted in the second direction 198. In this particular embodiment, the first and second removal forces differ. As shown, the second removal force is associated with overcoming both the first coil side 160 and the second coil side 162 of the spring ring 100 while the first removal force is associated with overcoming the second coil side 162 of the spring ring only.

In other examples, other coil spring rings according to the present application may be used with the housing 172 and pin 174 of FIGS. 8 and 8A. When the other different springs are used, different from the canted coil springs shown in FIGS. 7 and 7A, such as that shown in FIGS. 2-2D and 5-5D, the first and second removal forces for overcoming the same spring ring may be generally the same. The use of the canted coil springs shown in FIGS. 2D and 5D would also result in differing removal forces, such as different first and second removal forces, due to the direction or orientation of the two coil sections being different in moving in the same first direction or same second direction.

In some examples, the pin is without a pin groove and the connector 170 is a holding connector. Alternatively, the holding connector may have a pin with a pin groove and a housing bore without a housing groove. In still other examples, the pin groove is sized and shaped to not permit disconnection of the pin from the housing when the pin is latched and locked to the housing.

FIGS. 9 to 9B illustrate different views of the canted coil spring ring 100 of FIG. 7, which shows the ring 100 having different shaped coil sections 160, 162 along the radial centerline 164. FIG. 9A is a cross-sectional end view of FIG. 9 taken along line A-A. FIGS. 9C and 9D illustrate a canted coil spring length 118 that may be used to form the canted coil spring ring 100 shown in FIGS. 9 to 9B. FIG. 9D is an end view of the spring length 118 of FIG. 9C taken along line B-B.

FIGS. 10 to 10B illustrate different views of the canted coil spring ring 100 of FIG. 7A, which shows the ring 100 having different shaped coil sections 160, 162 along a radial centerline 164. FIG. 10A is a cross-sectional end view of FIG. 10 taken along line A-A. FIGS. 10C and 10D illustrate a canted coil spring length 118 that may be used to form the canted coil spring ring 100 shown in FIGS. 10 to 10B. FIG. 10D is an end view of the spring length 118 of FIG. 10C taken along line B-B.

While the spring rings discussed herein have been disclosed in combination with a connector, such as that shown in FIGS. 8-8A, the disclosed spring rings 100 may be used to energize seal jackets, i.e., spring energized seals, for electrical connector applications by constructing the spring rings out of a conductive material, and for mechanical connection applications, such as to hold two or more components together. Further, the springs may be used in a number of industries, including the in medical industry, in the aerospace industry, in oil and gas industry, in the automotive industry, and consumer electronic industry, to name a few.

FIG. 11 shows a canted coil spring ring 100 comprising a plurality of interconnected coils 102 each being defined by a wire path 104 that results in a coil cross section that, when viewed along the coil axis, comprises at least three differentiated spaces 106, 108, 107 each confined by a single continuous wire 110. The different coils may be classified as a first coil section 160, a second coil section 162, and a third coil section 161. Although a typical spring length may have a wire 110 that is joined from two or more wire lengths in order to roll an elongated length of spring, at least three continuous coils located side-by-side-by-side of the spring ring 100 or spring length 118 are formed from a single continuous wire. The three differentiated spaces 106, 108, 107 are essentially elliptical.

FIG. 12 shows a coil spring ring 100 comprising a plurality of interconnected coils 102 each being defined by a wire path 104 that results in a coil cross section that, when viewed along the coil axis, comprises at least three differentiated spaces 106, 108, 107 each confined by a wire 110. The different coils may be classified as a first coil section 160, a second coil section 162, and a third coil section 161. The three differentiated spaces 106, 108, 107 are essentially elliptical. In addition, two of the coils are partially overlapped and have a common overlapped central section 150 with first and second first small differentiated spaces 152, 154. As shown, the spring ring 100 of FIG. 12 has two coils that partially overlap and two coils that form a figure-eight shape.

FIG. 13 illustrates three areas defined by the three differentiated spaces 106, 108, 107 of the cross sections of coils of FIG. 11. For the most part, the three areas are each generally elliptical and each being spaced from one another by a gap or space 142.

FIG. 14 shows the areas defined by the three differentiated spaces 106, 108, 107 of the cross sections of the coils of FIG. 12. For the most part, the three areas are each generally elliptical with two of the areas 106, 108 partially overlap and have a common overlapped central section 150 and the third area 107 spaced from the second area 108 by a gap or space 142.

FIG. 15 shows a canted coil spring ring 100 comprising a plurality of interconnected coils 102 each being defined by a wire path 104 that results in a coil cross section that, when viewed along the coil axis, comprises at least four differentiated spaces 106, 108, 107, 109 each confined by a single continuous wire 110. The different coils may be classified as a first coil section 160, a second coil section 162, a third coil section 161, and a fourth coil section 163. As used herein, a coil section is a coil 102. Alternatively, all four coil sections 160, 162, 161, 163 may be viewed as a single coil with a complex configuration, such as having two back-to-back figure eight shape. Although a typical spring length may have a wire 110 that is joined from two or more wire lengths in order to roll an elongated length of spring, at least four continuous coils located side-by-side-by-side-by-side of the spring ring 100 of FIG. 15 are formed from a single continuous wire. The four differentiated spaces 106, 108, 107, 109 are essentially elliptical and resemble two figure eight shape structures aligned back-to-back.

FIG. 16 shows a coil spring ring 100 comprising a plurality of interconnected coils 102 each being defined by a wire path 104 that results in a coil cross section that, when viewed along the coil axis, comprises at least four differentiated spaces 106, 108, 107, 109 each confined by a wire 110. The different coils may be classified as a first coil section 160, a second coil section 162, a third coil section 161, and a fourth coil section 163. The four differentiated spaces 106, 108, 107, 109 are essentially elliptical. In additional, two of the coils are partially overlapped and have a common overlapped central section 150. As shown, the first and the second coil sections 160, 162 partially overlap and have a common overlapped central section 150 while the third coil section 161 and a fourth coil section 163 partially overlap and have a common overlapped central section 150.

FIG. 17 illustrates four areas defined by the four differentiated spaces 106, 108, 107, 109 of the cross sections of the coils 102 of FIG. 15. For the most part, the four areas are each generally elliptical and each being spaced from one another by a gap or space 142.

FIG. 18 shows the areas defined by the four differentiated spaces 106, 108, 107, 109 of the cross sections of the coils of FIG. 16. For the most part, the four areas are each generally elliptical with the four areas 106, 108, 107, 109 forming two partially overlapped sections and having a common overlapped central section 150. Additionally, a gap or space is provided 142 between the middle of the four coils.

FIGS. 19 and 20 show non-canted coil spring rings 100 comprising a plurality of interconnected coils 102 each being defined by a wire path 104 that results in a coil cross section that, when viewed along the coil axis, comprises at least two differentiated spaces 106, 108 each confined by the wire 110. Each coil is more generally circular than the coils 102 of FIGS. 2, 11, and 15.

FIG. 20 shows a non-canted coil spring 100 comprising a plurality of interconnected coils 102 each being defined by a wire path 104 that results in a coil cross section that, when viewed along the coil axis, comprises at least two differentiated spaces 106, 108 each confined by the wire 110. The two differentiated spaces 106, 108 are essentially circular and partially overlapped and have a common overlapped central section 150. Note that the at least two differentiated spaces of the non-canted coil spring rings of FIGS. 19 and 20 may also be essentially elliptical, essentially elliptical comprising at least one perimetric perturbation, partially elliptical or essentially polygonal. Other shapes are possible as well and the two coils located side-by-side may have different coil shapes, i.e., being non-symmetrical about a radial centerline 164.

FIGS. 21 and 22 illustrate the two differentiated spaces 106, 108 of the coil cross sections of the non-canted coil spring rings 100 of FIGS. 19 and 20, respectively. As shown, a gap or space 142 is provided between the two spaces of FIG. 21 while the two areas of FIG. 22 are partially overlapped and has a common overlapped central section 150.

FIG. 23 shows a spring energized lip seal assembly 210 positioned in a gland or housing 212 and sealing against a surface 214, such as a shaft of a pump. As shown, the seal assembly 210 comprises an elastic seal body 214 comprising an inside flange 216 and having a sealing lip 218 for sealing against the shaft 214 to form a seal against fluid leakage along the shaft surface. A locking ring 218 is provided for securing the elastic body 214 within the gland and to prevent the same from rotating during service.

A spring ring 100 with a coil cross section comprising two differentiated spaces 106, 108 is used to energize the sealing lip 218. As shown, the coil spring ring 100 is used as a garter spring. Thus, the spring ring 100 may be a canted or a non-canted coil spring ring. The spring ring 100 may be any of the spring rings discussed elsewhere herein.

In an alternative embodiment, the seal body 214 comprises an upper or outside flange (not shown) and a lower or inside flange 216 and connected to one another by a center channel section. The two flanges and the center channel section define a spring cavity for receiving one of the spring rings disclosed herein. In the alternative embodiment, both flanges would be energized by the canted coil spring ring 100. In this alternative embodiment, the canted coil spring ring is positioned in the spring cavity 220 and biases against both the inner flange and the outer flange. The locking ring 218 may be attached to the outside flange or to the center channel section of the seal body, i.e., to the seal body opposite the seal tip 224. The canted coil spring ring may be any of the canted coil spring rings discussed elsewhere herein.

FIG. 24 is a blown up view of the inner flange 216 with the spring ring 100 and sealing against the shaft 214.

FIG. 25 illustrate a connector housing 230 comprising a flange 232 and a cylinder end 234 comprising a body section 236 and a lip 238. A plurality of openings 240 are provided on the body section 236 and are in communication with the bore 242.

Figure 26:
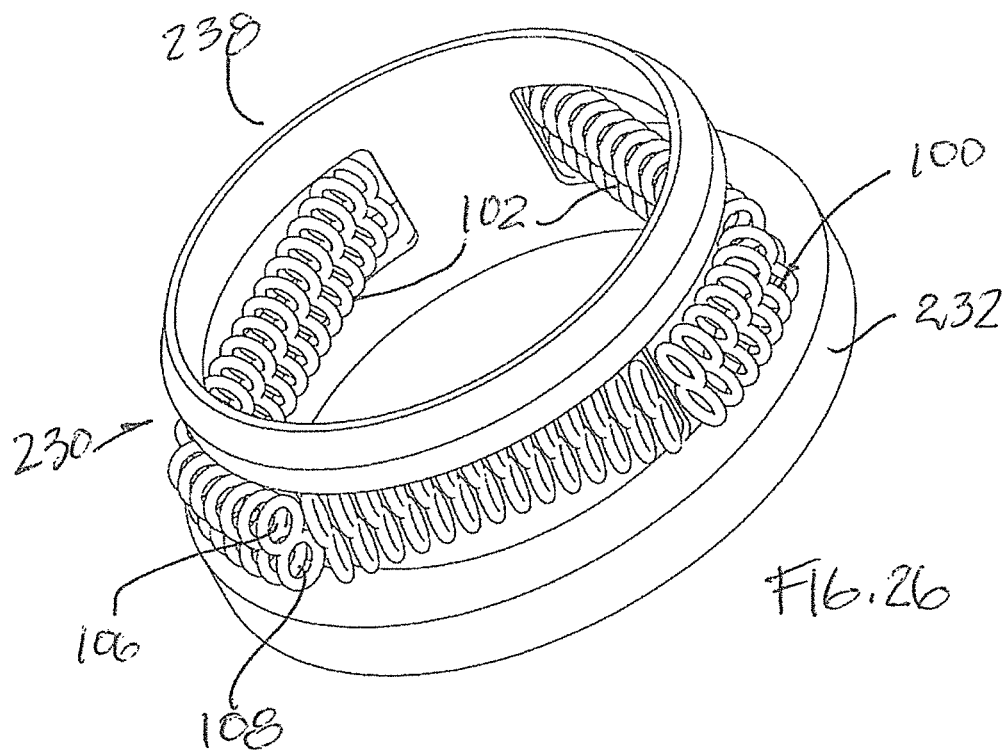

FIG. 26 shows a coil spring ring 100 comprising two differentiated spaces mounted on the body section 236 of the housing 230. The housing may be used in electrical applications, such as for receiving a shaft or pin (not shown) in the bore 242. The coil spring ring 100 is used as a garter spring, therefore it may be a canted or a non-canted coil spring ring. The coils 102 of several spring ring sections project through the openings 240 of the body section 236 for contacting the surface of the shaft (not shown) when the shaft is inserted into the bore 242. U.S. Pat. No. 7,299,095, assigned to Pacesetter, Inc., shows a similar configuration. As shown in FIGS. 25 and 26, using the coil spring rings described in this application and in this and other similar configuration allows for an increased number of contact points with the shaft (not shown). For example, because the spring rings described herein have coils that stack two or more wide, they provide additional contact surface areas, which reduce resistance and provides greater conductive paths than prior art spring rings.

Note that subsequent discussions of the present application following the spring ring and length of FIGS. 1-1F are built upon the foundation of earlier discussions unless the context indicates otherwise. The disclosure is therefore understood to teach a person of ordinary skill in the art the disclosed embodiments and the features of the disclosed embodiments without having to repeat similar components and features in all embodiments. Said differently, the same or similar features shown in the following connectors incorporate the teachings of the earlier embodiments unless the context indicates otherwise or unless they conflict. Thus, it is contemplated that later disclosed embodiments enjoy the benefits of earlier expressly described embodiments, such as features and structures of earlier described embodiments, unless the context indicates otherwise without repeating redundant well understood features from earlier expressly disclosed same or similar features.

Although limited embodiments of coil springs, applications of coil springs, and related methods and their components have been specifically described and illustrated herein, many modifications and variations will be apparent to those skilled in the art. For example, while limited examples of spring energized lip seals and connectors are described, the springs with complex configurations described herein may be used with other seals and other connectors. Furthermore, it is understood and contemplated that features specifically discussed for one coil springs, applications of coil springs, and related methods may be adopted for inclusion with another coil springs, applications of coil springs, and related methods, provided the functions are compatible. Accordingly, it is to be understood that the coil springs, applications of coil springs, and related methods and their components constructed according to principles of the disclosed device, system, and method may be embodied other than as specifically described herein. The disclosure is also defined in the following claims.

The invention claimed is:

1. A coil spring comprising:
a plurality of interconnected canted coils comprising a coil axis;
each coil being defined by a wire having a wire path that results in a coil cross section that, when viewed along the coil axis, comprises at least a first space and a second space differentiated from each other and each confined by the wire; and
wherein each coil has a coil width that is greater than a coil height to increase surface contact areas of the coil.

2. The coil spring of claim 1, wherein all the coils have generally a same first space shape and size and generally a same second space shape and size.

3. The coil spring of claim 2, wherein the shape of one of the first and second spaces is one of generally circular, generally elliptical, generally elliptical comprising at least one perimetric perturbation, partially elliptical, and generally polygonal.

4. The coil spring of claim 2, wherein the first space and second space shapes and sizes are generally the same.

5. The coil spring of claim 1, wherein the coil spring is a coil spring ring.

6. The coil spring of claim 1, wherein the first and second spaces of at least one coil overlap.

7. The coil spring of claim 6, wherein all the coils have generally a same first space shape and size and generally a same second space shape and size.

8. The coil spring of claim 7, wherein the shape of one of the first and second spaces is one of generally circular, generally elliptical, generally elliptical comprising at least one perimetric perturbation, partially elliptical, and generally polygonal.

9. The coil spring of claim 1, further comprising a housing wherein the spring is located in a groove of the housing having a bore.

10. The coil spring of claim 1, further comprising a lip seal wherein the spring is biased against an inside flange of the lip seal.

11. The coil spring of claim 1, further comprising ends of the coil spring connected to each other thereby generating a closed shape.

12. The coil spring of claim 11, wherein the closed shape is one of generally circular, generally elliptical and generally polygonal.

13. A method for forming a coil spring comprising:
coiling a wire to form a plurality of interconnected canted coils comprising a coil axis, each coil being defined by a wire having wire path that results in a coil cross section that, when viewed along the coil axis, comprises at least a first space and a second space differentiated from each other and each confined by the wire;
repeating the coiling to produce at least three interconnected coils; and
wherein each coil has a coil width that is greater than a coil height to increase surface contact areas of the coil.

14. The method of claim 13, wherein all the coils have generally a same first space shape and size and generally a same second space shape and size.

15. The method of claim 14, wherein the shape of one of the first and second spaces is one of generally circular, generally elliptical, generally elliptical comprising at least one perimetric perturbation, partially elliptical, and generally polygonal.

16. The method of claim 14, wherein the first space and second space shapes and sizes are generally the same.

17. The method of claim 16, further canting the interconnected coils along a same direction.

18. The method of claim 13, wherein the first and second spaces of at least one coil overlap.

19. The method of claim 18, wherein the coils have generally the same first space shape and size and generally the same second space shape and size.

20. The method of claim 13, further comprising placing the coil spring in a groove of a housing or a pin.

21. The method of claim 13, further comprising placing the coil spring in a spring cavity of a lip seal.

22. A connector assembly comprising:
a housing having a bore;
a pin located in said bore of said housing;
a groove in said housing or on said pin;
a coil spring in said groove to connect said pin to said housing;
wherein said coil spring comprises a plurality of interconnected canted coils comprising a coil axis, each coil being defined by a wire having a wire path that results in a coil cross section that, when viewed along the coil axis, comprises at least a first space and a second space differentiated from each other and each confined by the wire; and
wherein each coil has a coil width that is greater than a coil height to increase surface contact areas of the coil.

* * * * *